United States Patent
Guillon et al.

(10) Patent No.: US 10,752,555 B2
(45) Date of Patent: Aug. 25, 2020

(54) METHOD FOR REINFORCING TRANSPARENT CERAMICS, AND CERAMIC

(71) Applicant: FORSCHUNGSZENTRUM JUELICH GMBH, Juelich (DE)

(72) Inventors: Olivier Guillon, Juelich (DE); Marc Rubat Du Merac, Altbach (DE); Martin Bram, Juelich (DE)

(73) Assignee: FORSCHUNGSZENTRUM JUELICH GMBH, Juelich (DE)

(*) Notice: Subject to any disclaimer, the term of this patent is extended or adjusted under 35 U.S.C. 154(b) by 0 days.

(21) Appl. No.: 16/312,461

(22) PCT Filed: Jun. 29, 2017

(86) PCT No.: PCT/DE2017/000189
§ 371 (c)(1),
(2) Date: Dec. 21, 2018

(87) PCT Pub. No.: WO2018/019316
PCT Pub. Date: Feb. 1, 2018

(65) Prior Publication Data
US 2019/0127285 A1    May 2, 2019

(30) Foreign Application Priority Data

Jul. 28, 2016 (DE) .......... 10 2016 009 153
Aug. 11, 2016 (DE) .......... 10 2016 009 730

(51) Int. Cl.
*C04B 35/645* (2006.01)
*C04B 35/488* (2006.01)
(Continued)

(52) U.S. Cl.
CPC .......... *C04B 35/6455* (2013.01); *B32B 18/00* (2013.01); *C04B 35/443* (2013.01);
(Continued)

(58) Field of Classification Search
None
See application file for complete search history.

(56) References Cited

U.S. PATENT DOCUMENTS 5,145,720 A  *  9/1992  Hirai .................. C03C 17/23
                                               427/255.36
5,702,654 A     12/1997  Chen et al.
(Continued)

FOREIGN PATENT DOCUMENTS

CN        105016776 A       11/2015
DE     102004004259 B3      11/2005
(Continued)

OTHER PUBLICATIONS

CN 105016776 (Chen) Nov. 4, 2015 (English language machine translation). [online] [retrieved Aug. 6, 2019]. Retrieved from: Espacenet. (Year: 2015).*
(Continued)

*Primary Examiner* — David Sample
(74) *Attorney, Agent, or Firm* — Leydig, Voit & Mayer, Ltd.

(57) ABSTRACT

A method for producing a transparent polycrystalline ceramic includes forming at least one planar transparent region near a surface within the ceramic, wherein the at least one planar transparent region has a lower thermal expansion coefficient than other regions of the ceramic. The method further includes generating compressive stresses in the at least one planar transparent region near the surface after a thermal treatment and cooling.

17 Claims, 5 Drawing Sheets

(51) Int. Cl.
  *C04B 41/00* (2006.01)
  *C04B 41/50* (2006.01)
  *C04B 35/486* (2006.01)
  *C04B 41/87* (2006.01)
  *B32B 18/00* (2006.01)
  *C04B 35/443* (2006.01)
  *C04B 111/80* (2006.01)

(52) U.S. Cl.
  CPC .......... *C04B 35/486* (2013.01); *C04B 35/488* (2013.01); *C04B 35/645* (2013.01); *C04B 41/00* (2013.01); *C04B 41/009* (2013.01); *C04B 41/5029* (2013.01); *C04B 41/5045* (2013.01); *C04B 41/87* (2013.01); *C04B 2111/805* (2013.01); *C04B 2235/3225* (2013.01); *C04B 2235/604* (2013.01); *C04B 2235/664* (2013.01); *C04B 2235/9607* (2013.01); *C04B 2235/9653* (2013.01); *C04B 2237/34* (2013.01); *C04B 2237/348* (2013.01); *C04B 2237/58* (2013.01); *C04B 2237/582* (2013.01); *C04B 2237/704* (2013.01)

(56) References Cited

U.S. PATENT DOCUMENTS

| | | | |
|---|---|---|---|
| 2005/0136188 A1* | 6/2005 | Chang | C04B 41/009 427/421.1 |
| 2005/0164867 A1 | 7/2005 | Krell et al. | |
| 2013/0078398 A1 | 3/2013 | Weber | |
| 2014/0255704 A1 | 9/2014 | Krell et al. | |
| 2014/0360345 A1 | 12/2014 | Schnetter et al. | |
| 2015/0329955 A1* | 11/2015 | Sun | C04B 35/505 428/446 |
| 2017/0088473 A1* | 3/2017 | Wilson | C04B 35/64 |

FOREIGN PATENT DOCUMENTS

| | | |
|---|---|---|
| DE | 102011080378 A1 | 2/2013 |
| EP | 2778252 A2 | 9/2014 |
| WO | WO 2009038674 A2 | 3/2009 |
| WO | WO 2013068418 A1 | 10/2018 |

OTHER PUBLICATIONS

David C. Miller, "Analysis of transmitted optical spectrum enabling accelerated testing of multijunction concentrating photovoltaic design", Optical Engineering, vol. 50, No. 1, Jan. 2011, pp. 013003-1-013003-17.

Isao Yamashiti, et al., "Development of highly transparent zirconia ceramics", TOSOH Research & Technology Review, vol. 56, Dec. 2012, pp. 11-16.

Rubat du Merac, "The Role of Impurities, Lif, And Processing On The Sintering, Microstructure, And Optical Properties Of Transparent Polycrystalline Magnesium Aluminate (Mgal2o4) Spinel", 2014—Mines, Theses and Dissertations, Dec. 2014, pp. 1-198.

G. R. Anstis, et al., „,A Critical Evaluation of Indentation Techniques for Measuring Fracture Toughness: I, Direct Crack Measurements, Journal of the American Ceramic Society, vol. 64, No. 9, Mar. 3, 1981, pp. 533-538.

Hideko Hayashi, et al., Thermal expansion coefficient of yttria stabilized zirconia for various yttria contents, Solid State Ionics, vol. 176, Dec. 2005, pp. 613-619.

G. de Portu, et al., „,Laminated ceramic structures from oxide systems, Composites: Part B, vol. 37, Dec. 2006, pp. 556-567.

Database WP, Week 201614, Thomson Scientific, London, GB; AN 2015-726214; XP002774001, pp. 1-18.

* cited by examiner

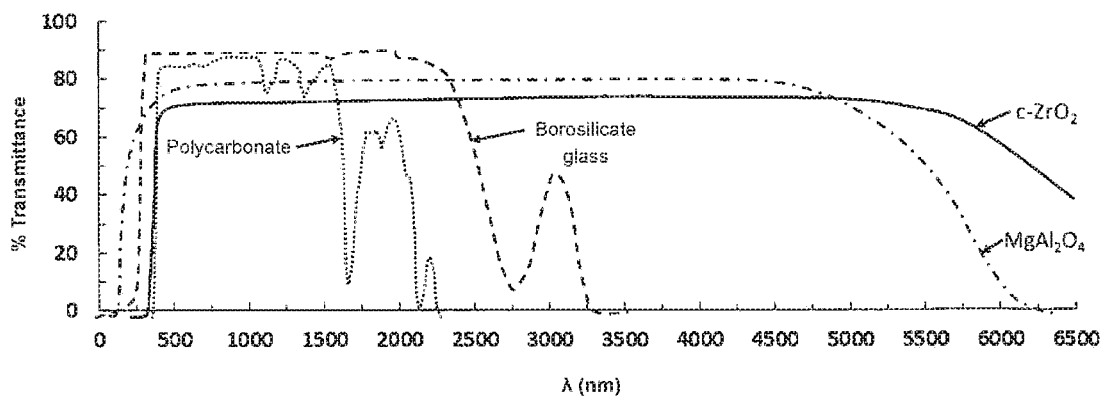
Figure 1 with data from [2, 3, 4, 5]
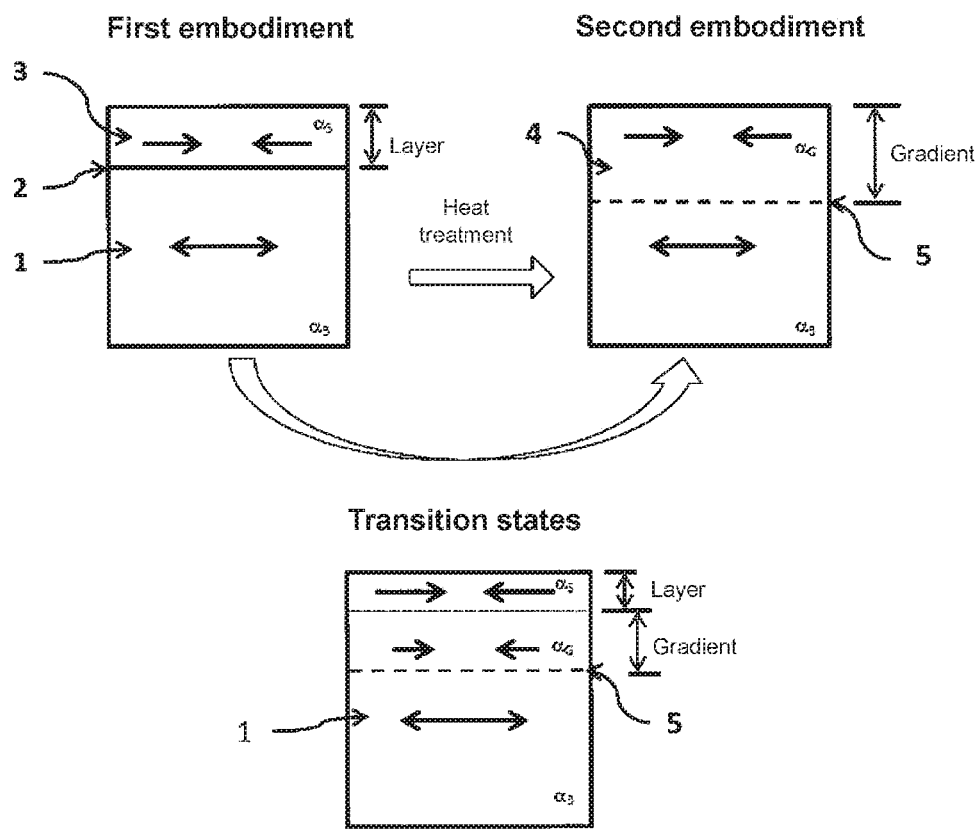
Figure 2

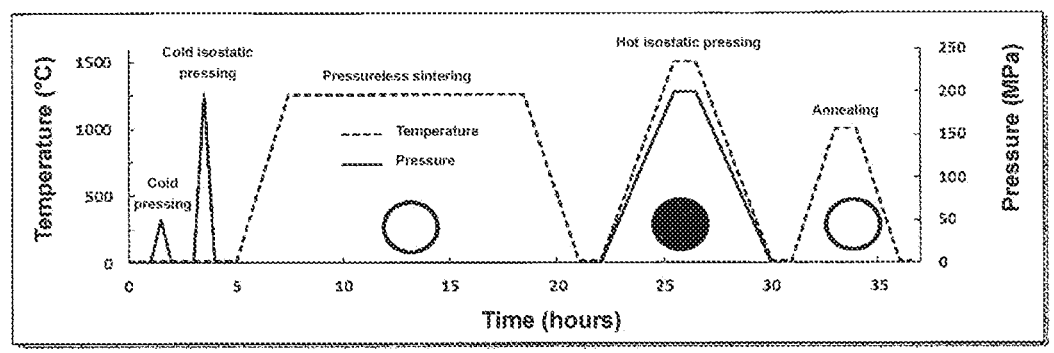
Figure 5
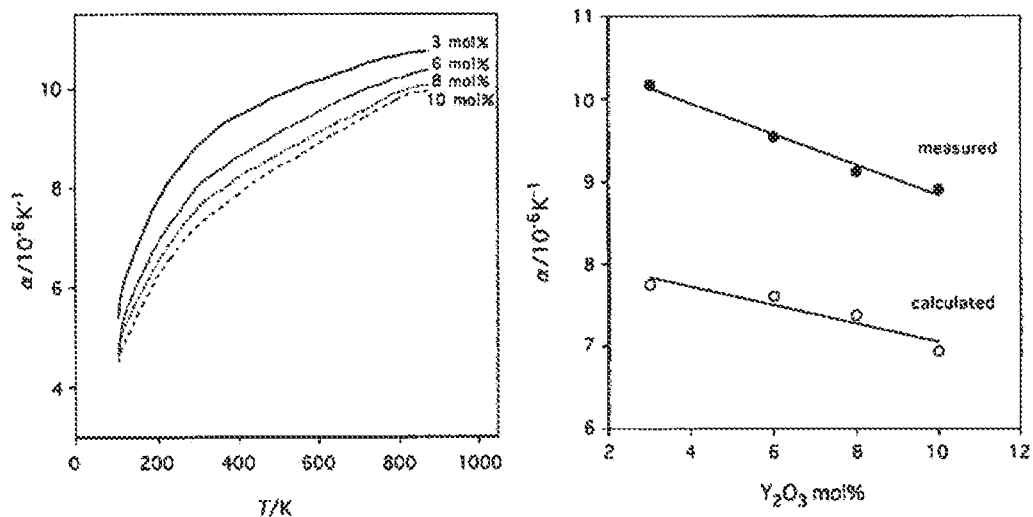
Figure 6 from [6]

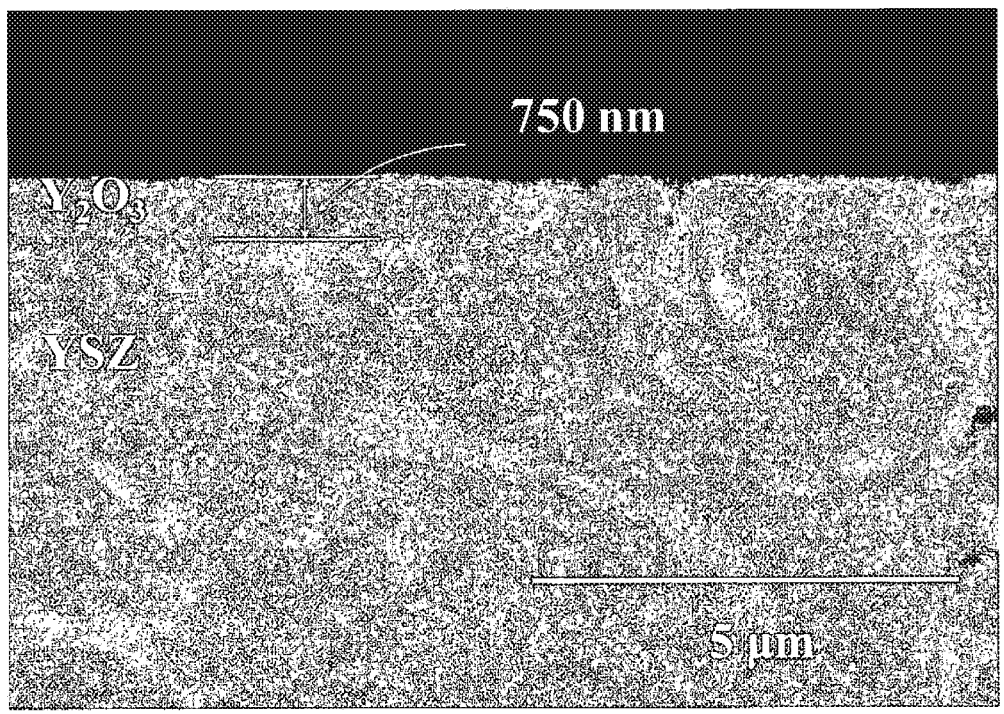
Figure 7
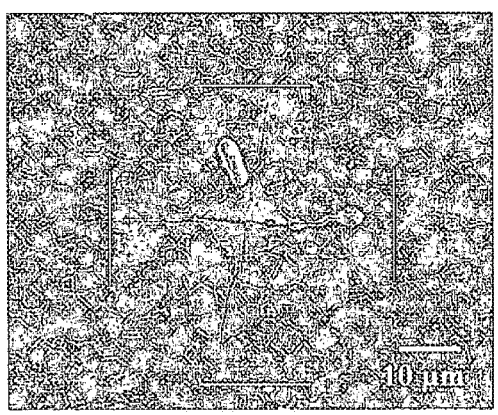
Fig. 8 (a)
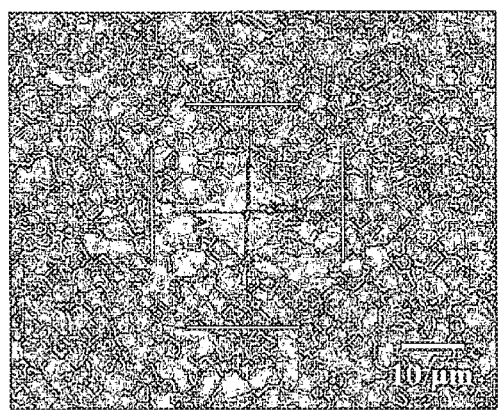
Fig. 8 (b)
Figure 8

METHOD FOR REINFORCING TRANSPARENT CERAMICS, AND CERAMIC

CROSS REFERENCE TO RELATED APPLICATIONS

This application is a U.S. National Stage Application under 35 U.S.C. § 371 of International Application No. PCT/DE2017/000189 filed on Jun. 29, 2017, and claims benefit to German Patent Application Nos. DE 10 2016 009 153.3 filed on Jul. 28, 2016, and DE 10 2016 009 730.2 filed on Aug. 11, 2016. The International Application was published in German on Feb. 1, 2018, as WO 2018/019316 A1 under PCT Article 21(2).

FIELD

The invention relates to the field of ceramics and concerns transparent composite components which have an increased fracture toughness. In particular, the invention relates to novel transparent ceramics and to a novel method for reinforcing and hardening polycrystalline transparent ceramics and for selectively influencing the refractive index and the reflection.

PRIOR ART

From the literature are known numerous transparent components with almost thickness-independent, high light transmittance of ultraviolet, visible, and infrared wavelengths.

For cubic Mg—Al spinels, for example, a clear transparency of components with thicknesses in the cm range can be realized, provided that the residual porosity can be reduced to below a hundredth. To this end, a sintering step is generally carried out at high temperatures above 1,500° C., which can, however, disadvantageously lead to a reduced load capacity as a result of the grain growth.

Recent studies show that new, fine-crystalline spinel ceramics can avoid this disadvantage. These spinel ceramics have a low dependency of the transmittance on the layer thickness and a high transmittance over a wide range of wavelengths from UV to IR ($\lambda = 2 \cdot 10^{-7} \text{-} 6 \cdot 10^{-6}$ m). They also have a high hardness (HV10=1,450-1,500) because of their small grain sizes of up to <1 µm [1].

An overview of the dependence of the transmittance on the wavelength for different materials is shown in FIG. 1. The data obtainable from the literature for PC [2] and borosilicate [3] were illustrated in a diagram together with those of cubic c-$ZrO_2$ [4] and $MagAl_2O_4$ [5].

For use as protective layers, high requirements are to be placed on such transparent ceramics. In particular, a high hardness, in addition to a high modulus of elasticity, is among the most important prerequisites for a high protective effect.

The hardness of densely sintered polycrystalline ceramics can be both higher and lower than those of corresponding single crystals, and higher particularly when a fine-grained structure is present.

The fracture toughness of transparent ceramics is generally significantly lower than the predicted theoretical values, such that transparent ceramics compete with glasses or single crystals only in special applications, as a result of their current higher fabrication costs.

The fact that hardening or reinforcement can take place by introducing compressive stresses into the surface of components has already previously been described for metals, alloys, glasses, and non-transparent ceramics.

From the prior art is known, for example, that a hardening or a reinforcement of non-transparent ceramics can take place by producing layered composite materials. In this case, on the one hand, different ceramics respectively having different thermal expansion coefficients are used. On the other hand, doping with cations, e.g., by implanting ions that have a greater atomic radius than the cations of the basic structure, also causes the formation of a compressive stress at the surface.

The methods known so far for reinforcing non-transparent ceramics by introducing compressive stresses into the surface are not readily transferable to transparent ceramics, since non-transparent ceramics do not place the same requirements on light transmittance, as shown below:

The interfaces between transparent ceramics with different refractive indices must be planar and aligned perpendicular to the incident light.

Regions with different refractive indices, cracks, or pores may only be present in less than 0.01 vol % of the material.

The residual stress of transparent ceramics must be aligned homogeneously in a plane perpendicular to the incident light, just as stress gradients must be aligned perpendicular to the incident light.

The crystal structure must extend to the interface unchanged—particularly in the case of cubic structures.

The grain sizes of polycrystalline birefringent transparent ceramics must be below the expected wavelengths of the light passing through.

In addition, the properties of a transparent ceramic may not be changed during production of the ceramic with respect to the light transmittance.

In DE 10 201 1 080 378 A1 is thus described, for instance, a transparent composite disk for safety applications, which avoids the previous disadvantages with respect to the transmittance and quality of transparent polycrystalline ceramics, as well as the limited protective effect, as shown by $Al_2O_3$ single crystals in comparison to finely crystalline transparent $Al_2O_3$ or spinel sintered ceramics. To this end, a transparent composite disk is provided in which the composite consists of several layers which are arranged one behind the other and of which at least one layer consists of one or more plates of monocrystalline magnesium-aluminate spinel arranged in the form of a mosaic or in series.

Furthermore, known from DE 10 2004 004 259 B3 is a transparent polycrystalline sintered ceramic with a cubic crystal structure of Mg—Al spinel, Al oxynitride, $ZrO_2$, or Y—Al garnet, or a mixed structure composed of these components, which, with an average grain size D in the range of 60 nm<D<10 µm, has a Vickers hardness of HV10>13 GPa.

SUMMARY

In an embodiment, the present invention provides a method for producing a transparent polycrystalline ceramic. The method includes forming at least one planar transparent region near a surface within the ceramic, wherein the at least one planar transparent region has a lower thermal expansion coefficient than other regions of the ceramic, and generating compressive stresses in the at least one planar transparent region near the surface after a thermal treatment and cooling. Furthermore, a planar transparent polycrystalline coating with a thermal expansion coefficient as is applied as a region near a surface to a transparent polycrystalline ceramic body with a thermal expansion coefficient $\alpha_B$, where $\alpha_B > \alpha_S$, wherein a planar transparent and ionically or covalently bonded interface is produced between the transparent polycrystalline ceramic body and the planar transparent polycrystalline coating, and wherein ZrO2 doped with Y2O3 (YSZ) is selected as a material for the ceramic body, and wherein Y2O3 is selected as a material for the planar transparent polycrystalline coating; or at least two different ceramic starting powders having different thermal expansion coefficients are arranged above one another in layers over a planar interface, wherein a starting powder having a lower thermal expansion coefficient is arranged on a surface, and wherein ZrO2 doped with Y2O3 is selected as the ceramic starting powder and has a higher molar proportion of yttrium for the planar transparent region near the surface than for the other regions.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following:

FIG. 1 provides a representation of the transparency of various materials in the wavelength range of >0 to 6,500 nm, with data from [2, 3, 4, and 5];

FIG. 2 provides a schematic representation of polycrystalline transparent ceramics according to embodiments of the invention, with corresponding compressive stresses in a region near the surface.

FIG. 5 illustrates a schematic process sequence for the production of the polycrystalline transparent bulk ceramic, with the process parameters, pressure and temperature;

FIG. 6 provides a representation of the thermal expansion coefficients of differently doped YSZ from [7];

FIG. 7 provides a scanning electron microscopic image of a thin, planar $Y_2O_3$ coating applied by EB PVD to a transparent component comprising 8-YSZ;

FIG. 8 (a) illustrates test impressions on the surface of an uncoated, transparent 8-YSZ component; and FIG. 8(b) illustrates test impressions on an 8-YSZ component coated by means of EB PVD with Y2O3, after a thermal treatment.

DETAILED DESCRIPTION

Figure 3:
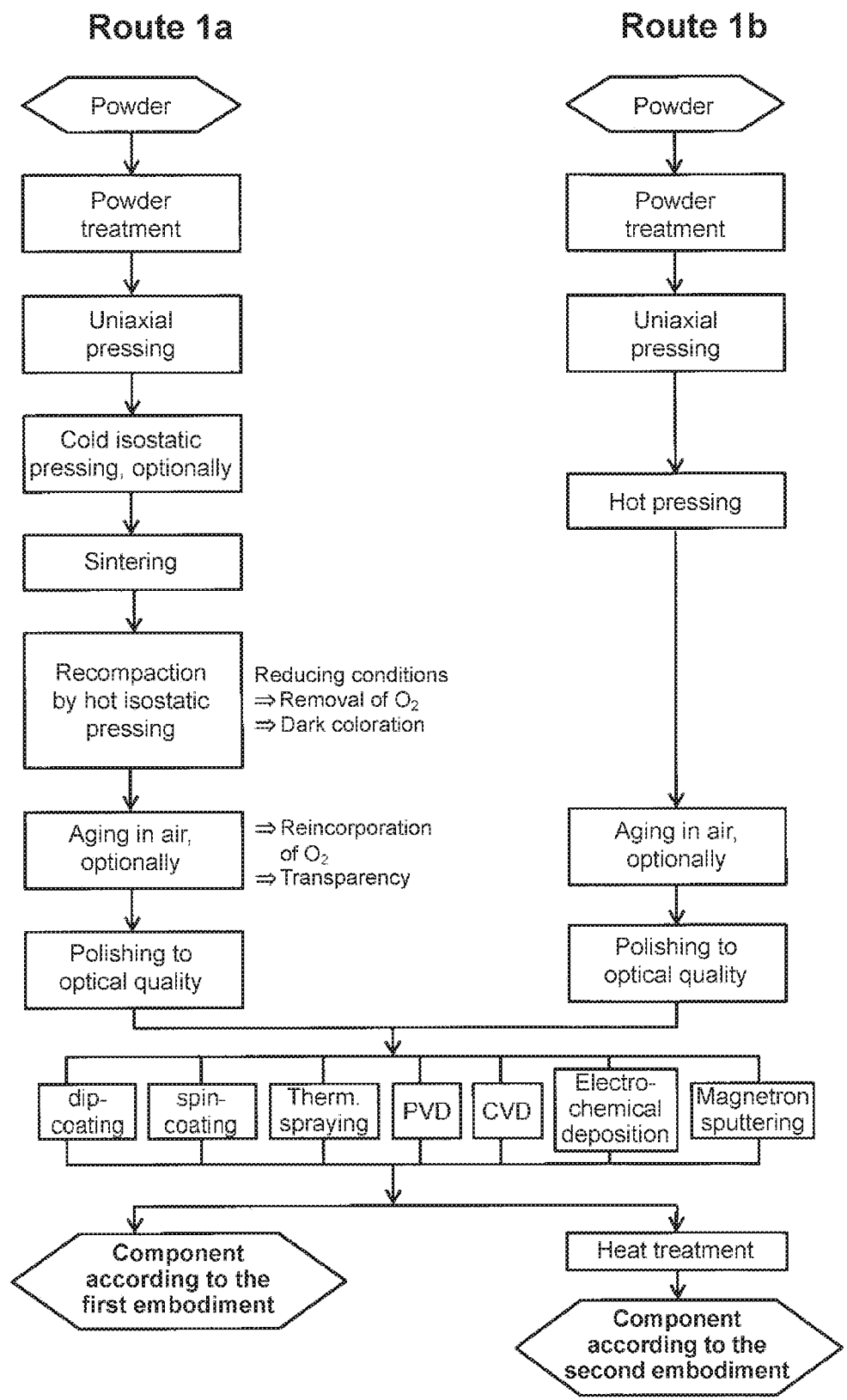
FIG. 3 illustrates possible method steps for producing a polycrystalline transparent ceramic according to a first embodiment and, optionally, a second embodiment (routes 1a and 1b)

Embodiments of the invention provide transparent polycrystalline sintered ceramics having an improved fracture toughness as compared with prior art ceramics.

Embodiments of the invention also provide production methods for producing such improved transparent polycrystalline ceramics.

In the context of the invention, it was found that, by forming compressive stresses in the region near the surface of a transparent polycrystalline ceramic, the ceramic can be significantly reinforced, and the fracture toughness, in particular, can be improved.

In the context of the invention, the term, "transparent" or "transparency," is understood as a clear transparency, as provided, for example, for window glass in the visible light range. Transparent is thus distinguished from translucent, which characterizes a translucent property, and thus a partial light transmittance. A typical example from daily life is milk glass.

The breaking force is a term used in material testing for the force needed to break or rupture a test specimen while constantly increasing the load. The breaking force is usually given as force (in N) or as fracture stress or fracture toughness (in $N/mm^2$) in relation to the component cross-section.

The strength can be further differentiated, according to the type of force introduction, into tensile strength, compressive strength, flexural tensile strength, shear strength, or torsional strength. The strength is a material-dependent quantity and, in particular, also depends upon the temperature. Brittle materials generally break after a purely elastic deformation without plastic portions, and thus have a low elongation at break. The strength is determined by the bonding forces in the crystal lattice and by defects and irregularities in the structure (e.g., grain boundaries, pores, foreign atoms, or foreign phases), as well as by defects on the surface (e.g., roughness or scratches). Depending upon the type of defects, the strength can either increase or decrease.

On the other hand, fracture toughness describes the resistance of a material to unstable crack propagation. The material characteristic value is the critical stress intensity factor $K_{Ic}$, at which unstable crack propagation starts.

The invention provides a method with which the fracture toughness of a polycrystalline transparent ceramic can, advantageously, be improved. In this respect, the invention also provides polycrystalline transparent ceramics having improved fracture toughness.

These improvements can be checked by, in particular, a measurement which proceeds similarly to a hardness test. In a hardness test, the resistance of a test specimen to penetration by another, harder specimen is measured. The hardness of a specimen thus depends, in particular, upon the structure present in the specimen. This is influenced by the type of crystal lattice and also the type of processing in the production of the specimen.

The Vickers method is, for example, used for hardness testing. In the process, a penetrator in the form of a straight pyramid is perpendicularly pressed into the surface of the test specimen with a test force F [in N]. The base of the pyramid is square; the angle between the opposite sides is 136°. The Vickers hardness can be calculated from the average value of the diagonal of the test impression.

An analogous method can be used for testing fracture toughness. However, in this case, not only the test impressions of the diagonal are taken into account, but the cracks extending therefrom are also measured. Furthermore, as a result of the selection of the test specimen, different impression depths can be achieved, so that statements about both a coating near the surface and an underlying region can be made. The fracture toughness test proposed here is used, in particular, for comparative purposes and generally does not yield absolute measured values with regard to fracture toughness.

In contrast, the fracture toughness of brittle ceramics can be estimated with good accuracy from the resulting crack length using the equation of Anstis et al. [6]. The Vickers test specimen being pressed into the sample with force F in the hardness test produces a test impression that documents the hardness H of the material. In the case of brittle materials, a crack of length c also forms at the corners of the test impression. The stress intensity factor characteristic of the material is calculated according to Anstis with knowledge of the modulus of elasticity of the material:

$$K_{IC} = 0.016(E/H)^{1/2}\left(\frac{F}{c^{3/2}}\right)$$

Known materials for transparent ceramics are, in particular, polycrystalline zirconia ($ZrO_2$), the cubic phase of which is stabilized by dopings with, e.g., Y, Sc, Mg, Ce, or Ca, or corundum (a-$Al_2O_3$), or the spinel ceramic ($MgAl_2O_4$). Furthermore, transparent ceramics made of Al oxynitride or garnets based upon Y and Al are also known. The light transmittance frequently varies with the size of the structure and often already shows a no longer clear transparency for structure sizes of >20 µm. The thickness of self-supporting transparent ceramics is in the range from 100 µm to several cm, with the light transmittance, as a rule, decreasing as the layer thickness increases. Furthermore, the number of defects in the structure and at the surface must not exceed a critical value, in order to ensure transparency.

The invention proposes that, for strengthening and increasing the fracture toughness of a polycrystalline transparent ceramic, a compressive stress be generated in at least one region near the surface. This can be done according to the invention in two ways.

To this end, either, on the surface of a polycrystalline transparent ceramic body, a compatible, planar, and ionically or covalently bonded, polycrystalline transparent ceramic surface region can be arranged (first embodiment) or, within a polycrystalline transparent ceramic, a planar region near the surface can be produced with a continuous gradient (S) with respect to the content of the doping element or the stoichiometric composition of the ceramic (second embodiment). FIG. 2 schematically shows an overview of the solutions provided according to the invention.

A special embodiment of the invention provides that a compressive stress be respectively generated in the regions near the surface on two opposite sides (front side and rear side) in order to strengthen and increase the fracture toughness of a polycrystalline transparent ceramic. This is then referred to as a sandwich structure.

By a heat treatment at temperatures above 800° C., the first embodiment of the invention can advantageously be converted into the second embodiment, wherein any number of transition states can be produced, which, on the one hand, no longer have sharp interfaces, such as the first embodiment, and in which, on the other, the generated gradient does not yet completely reach to the surface, as in the second embodiment.

This means that, by selecting the starting materials in combination with an adapted heat treatment, the gradient in the transition zone from the surface to the bulk region, e.g., the gradient of the yttrium concentration, can advantageously be adjusted exactly, and thus also the resulting compressive stress in this region. In this way, compressive stresses up to values that are comparable to those of ion-exchange glasses can be achieved with the method according to the invention. However, at the same time, the optical properties of the ceramic are not adversely affected thereby, since the surface is routinely optically smooth, flat, and free of pores and has small secondary phases.

With respect to the coatings known from the prior art with the typical sharp transitions, the formation of a continuous transition (gradient) according to the invention has proven to be particularly advantageous for improving the adhesion of the coating. In the case of a mechanical load and/or harsh temperature cycles, this routinely leads to a significant avoidance of crack formation at the interface.

As a result of the different thermal expansion coefficients between the bulk material of the polycrystalline transparent ceramic ($\alpha_B$) and the applied polycrystalline transparent ceramic surface region ($a_S$), on the one hand, or between the bulk material of the polycrystalline transparent ceramic body ($a_B$) and the region with the stoichiometric gradient ($\alpha_G$), on the other, compressive stresses can thus advantageously be produced on the surface of the body or in a region near the surface. In the following, the index S stands for a region near the surface, the index B for bulk phase, and the index G for a graduated region within the ceramic.

The compressive stresses occur during cooling from the sintering temperature or the heat treatment temperature, since the bulk region tends to contract more strongly as a result of the higher expansion coefficient. This contraction is, however, partially or completely limited by the layer near the surface having a lower expansion coefficient, thereby resulting in compressive stresses in the region near the surface, unless they are reduced by cracking or delamination. A stepless gradient of the expansion coefficient (second embodiment and transition states) is advantageous, in order to counteract cracking or delamination.

For the production of a polycrystalline transparent ceramic according to the first embodiment (see FIG. 2), the invention relates in this respect to a method for producing a planar, ionically or covalently bonded, polycrystalline transparent ceramic surface region 3 (coating) on a likewise polycrystalline transparent ceramic body 1. The compatible polycrystalline transparent ceramic surface region 3 has a lower thermal expansion coefficient than the body 1 ($a_S < a_B$). The polycrystalline transparent ceramic body 1 and the compatible polycrystalline transparent ceramic surface region 3 are ionically or covalently bonded to one another via a planar interface 2.

The production of a polycrystalline transparent ceramic according to the first embodiment can be carried out via different method routes, of which two are represented by way of example in FIG. 3.

A first method variant (route 1a) for producing a polycrystalline transparent ceramic provides, for example, that, from a corresponding ceramic starting powder—optionally, after a powder treatment—a ceramic green body be produced by uniaxial pressing. The green body can optionally also be cold-isostatically pressed, which increases the homogeneity of the density distribution in the green body. The green body is subsequently sintered without pressure in air. In this case, the sintered green body generally has a density of approximately 95% of the theoretical density, such that the predominant part of the pores is present as a closed porosity and thus no longer has any connection to the component surface.

Recompaction of the closed pores in the sintered body by hot isostatic pressing follows, which is generally carried out in protective gas (e.g., Ar) as pressure transmission medium. The protective gas generally has an oxygen partial pressure well below 2 MPa (0.2 bar) so that the HIP process has reducing conditions for oxide ceramics.

If oxygen is removed from the crystal lattice as a result of the reducing conditions, discoloration of the component—in particular, black coloration, which is accompanied by a reduction in transparency—generally occurs. In order to reverse this effect, aging in an oxygen-containing atmosphere can optionally take place following the HIP process, as a result of which the ceramic body becomes transparent again by reoxidation, i.e., by reincorporating oxygen into the crystal lattice.

Before a further treatment, i.e., in particular, before a functional coating, the component is polished to optical quality on the surface intended for coating.

A second method variant (route 1b) for producing a polycrystalline transparent ceramic provides, for example, that a corresponding ceramic starting powder—optionally, after a powder treatment—be formed into a ceramic body by hot pressing. Optionally, uniaxial pressing can additionally also be carried out before this step.

The polycrystalline transparent ceramic body is subsequently aged in an oxygen-containing atmosphere.

Before a further treatment, i.e., in particular, before a functional coating, the polycrystalline transparent ceramic body is polished to optical quality on the surface intended for coating.

The production of a planar, ionically or covalently bonded, polycrystalline transparent ceramic surface region (functional coating) on a previously produced polycrystalline transparent ceramic body—in particular, produced according to route 1a or 1b—is then effected by conventional application methods, such as dip coating with subsequent sintering at moderate temperatures below 1,000° C., spin coating with subsequent sintering at moderate temperatures, or thermal spraying. Particularly advantageous methods are also physical vapor deposition (PVD), chemical vapor deposition (CVD), electrochemical deposition, or magnetron sputtering.

Suitable as material for the functional coating is, for example, $Y_2O_3$ for YSZ ceramics (YSZ=$ZrO_2$ doped with $Y_2O_3$). What is important is that the material for the polycrystalline transparent ceramic surface region 3 be selected such that its thermal expansion coefficient is less than that of the ceramic body 1 ($a_S < a_B$) so that, after cooling from the coating temperature, a compressive stress is formed in the region of the ceramic near the surface.

Directly after the coating, a transparent ceramic of the first embodiment is generally present. This ceramic can be converted, for YSZ and $MgAl_2O_4$ ceramics, by a heat treatment at temperatures above 1,400° C., depending upon the holding time, into the second embodiment or, with correspondingly shorter holding times, into transition states according to FIG. 2.

The compatible transparent ceramic surface layer 3 applied to the surface of the polycrystalline transparent ceramic body 1 preferably has a layer thickness of less than 5 μm—in particular, less than 1.5 μm. The applied layer should, however, have a minimum layer thickness of 0.1 μm.

The applied transparent ceramic surface region 3 furthermore has a homogeneous ceramic crystal structure. As a result of the compatibility between the ceramic body 1 and the functional coating 3, formation of secondary phases with pores and/or different refractive indices is also, advantageously, prevented.

The applied compatible polycrystalline transparent ceramic surface region 3 thus also advantageously retains the bulk properties of the ceramic of ceramic body 1 with regard to the transmittance in the surface region.

In this way, a polycrystalline transparent ceramic according to the invention according to the first embodiment can be produced, which ceramic can advantageously also easily be converted via various transition states into the second embodiment of the invention by a heat treatment.

Figure 4:
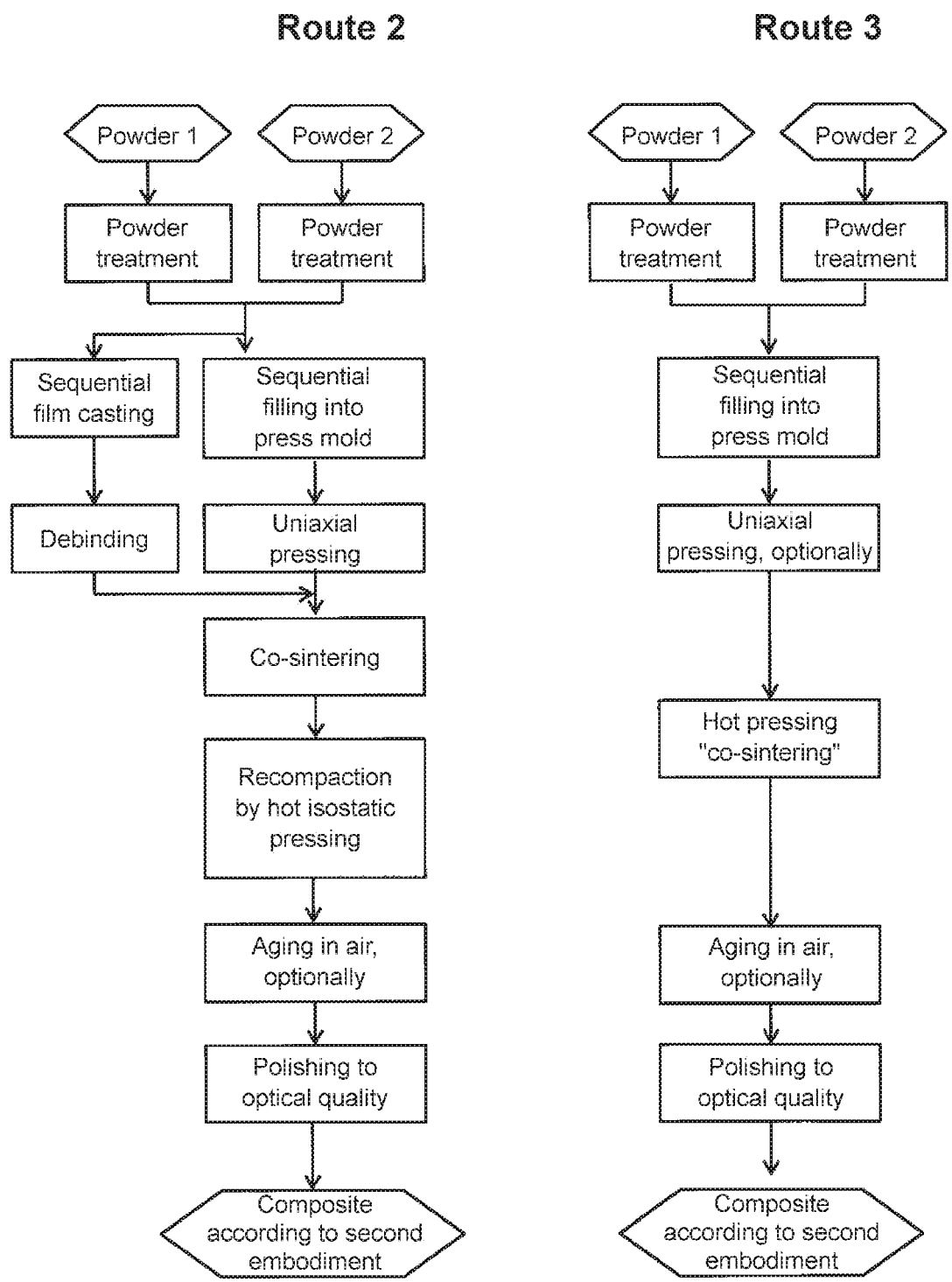
FIG. 4 illustrates possible method steps for producing a polycrystalline transparent ceramic according to the second embodiment (routes 2 and 3)

An alternative to the aforementioned methods for producing a polycrystalline transparent ceramic according to the invention according to the second embodiment provides that the ceramic be directly produced from the corresponding starting powders for the ceramic body and for the functional coating, and that they be sintered or pressed together. In this case, the material for the functional coating has a lower thermal expansion coefficient than the material for the ceramic body. For this case, two further method routes 2 and 3 are also schematically illustrated in FIG. 4 by way of example.

As a result of the heat treatment performed in the process, the formation of a region with a graduated stoichiometry takes place at the same time, which leads fully to the second embodiment, depending upon the duration of the temperature treatment, or else to one of the aforementioned transition states, in which, on the one hand, there is still a layer of the coating material near the surface, but, on the other, a region with a gradient of the doping element or a continuous change in the stoichiometry of the ceramic has also formed.

A method variant (route 2) for producing a polycrystalline transparent ceramic provides, for example, that corresponding ceramic starting powders for the ceramic body and the region near the surface—optionally, after a powder treatment—be placed via sequential filling into a press mold and, initially, uniaxially pressed there. A cold isostatic pressing step can, optionally, take place. Filling of the press mold with the powders is effected in such a way that a planar interface is created between the two different powders.

To be mentioned as materials suitable for this purpose are, in principle, those which can also be used in the method variants of routes 1a and 1b for the ceramic body and the functional coating. What is important is that the material for the region near the surface be selected such that its thermal expansion coefficient is less than that of the remaining ceramic body, so that a compressive stress is formed in the region of the ceramic near the surface after a heat treatment.

As an alternative to sequentially filling a press mold, sequential film casting with the two or, optionally, more corresponding ceramic starting powders with a subsequent debinding can also be provided.

The two-layer composite thus present in powder form is subsequently subjected to a simultaneous sintering of both layers—a so-called co-sintering—whereby a density of approximately 95% of the theoretical density is achieved.

In order to achieve transparency, recompaction of the co-sintered composite by hot isostatic pressing under reducing conditions follows.

To the extent that oxygen is removed from the polycrystalline transparent ceramic in the process, and discoloration of the ceramic—in particular, black coloration—is associated therewith, aging in an oxygen-containing atmosphere can, optionally, subsequently take place, whereby the polycrystalline ceramic becomes transparent again.

The front-side surfaces of the composite are polished to optical quality in order to remove surface roughness and scratches which limit transparency and fracture toughness.

A further method variant (route 3) for producing a polycrystalline transparent ceramic provides, for example, that corresponding starting powders for the ceramic body and the region near the surface—optionally, after a powder treatment—be placed into a press mold by sequential filling, wherein a planar interface between the two different powders is also created in this case.

Optionally, this powder fill can be uniaxially pre-compressed.

The sequentially filled powders are then compacted by hot pressing, which is carried out in one step. In doing so, a uniaxial pressure is applied to the powder via a die system during sintering so that complete compaction of the ceramic body and the region near the surface is achieved. A hot isostatic recompaction is not necessary in this case, since the complete compaction is already achieved after the hot pressing.

The hot pressing is also generally carried out in protective gas (e.g., argon) or in a vacuum, so that reducing conditions prevail similar to those in hot isostatic pressing for oxide ceramics. Furthermore, the die material customarily used—graphite—can also cause removal of oxygen from the oxide ceramic, since $CO_2$ can form at the contact surface. Accordingly, the result generally is that oxygen is removed from the structure, and discoloration is possibly associated therewith. In order to reverse this effect, aging in an oxygen-containing atmosphere can, optionally, subsequently take place again, as a result of which the polycrystalline ceramic becomes transparent again.

In this case as well, the surfaces (see above) are polished to optical quality.

The two different materials of the ceramic body and of the functional coating should be selected such that, preferably, no secondary phases having a different refractive index form at the interface during the production process of the polycrystalline transparent ceramic and the polycrystalline transparent coating. For the suitable selection of the material combination, it is preferable to use substance systems which have gapless miscibility in the corresponding phase diagram. Accordingly, the phase diagram should also not contain any secondary phases. In the event that secondary phases can nevertheless be formed according to the phase diagram, this has no adverse consequences for the production according to the invention, as long as the formation of these secondary phases takes place so slowly that the time span of the thermal treatment during the production of the ceramic does not routinely suffice to form the secondary phases.

In the production methods via starting powders, e.g., via the routes 2 or 3, more than two different ceramic materials can, optionally, also be used. For example, a first fill comprising 8-YSZ ($ZrO_2$ doped with 8 mol % $Y_2O_3$), a second layer comprising 10-YSZ ($ZrO_2$ doped with 10 mol % $Y_2O_3$), and finally another layer comprising 12-YSZ ($ZrO_2$ doped with 12 mol % $Y_2O_3$) can be placed into a press mold. Since the thermal expansion coefficient of zirconia decreases with increasing proportion of $Y_2O_3$, a region near the surface comprising 12-YSZ is also present here, which has a lower thermal expansion coefficient than the underlying layer—here, 10-YSZ—which in turn has a lower thermal expansion coefficient than the bottom layer—here, 8-YSZ.

With a sufficiently long heat treatment, there is generally a diffusive exchange of $Y^{3+}$ ions, which migrate from the regions near the surface toward the lower doped YSZ, while $Zr^{4+}$ ions migrate from the lower doped regions toward the surface. In this way, a continuously graduated YSZ region with increasing proportion of $Y_2O_3$ forms toward the surface. The proportion of $ZrO_2$ in the coating decreases from the interface to the surface. If a shorter heat treatment takes place, continuous transition states from the initially three-layer composition of the ceramic up to a ceramic with more or less graduated regions result.

It has been found that very dense coatings having a smooth, planar interface can be produced with the method according to the invention, wherein an unordered interface is formed, without formation of secondary phases and with a very thin layer thickness of preferably <1 nm. With the method according to the invention, compressive stresses of up to 750 MPa, which are comparable to those of ion-exchange strengthened glasses (>900 MPa—Schott Xensation®, >850 MPa—Corning Gorilla®), can be generated in the region near the surface. The notch impressions in the coatings according to the invention are routinely shorter—in particular, after a heat treatment. A rising temperature increase (heat treatment) simultaneously reduces the residual compressive stress and significantly increases the breaking strength, which is attributable to the counterdiffusion of the cations, e.g., $Y^{3+}$ or $Zr^{4+}$, which routinely leads to a thicker, densified region. In addition, transmittance may advantageously be increased and reflection reduced by a coating with yttrium according to the invention.

The fracture toughness for the coated component according to an embodiment of the invention could be increased by about 30%.

First Exemplary Embodiment for the Production of a Polycrystalline Transparent Ceramic According to the Second Embodiment of the Invention A polished, transparent ceramic component comprising $ZrO_2$ doped with 8 mol % $Y_2O_3$ (8-YSZ), which can be produced according to one of the routes 1a or 1b, is coated with a thin layer comprising yttrium oxide ($Y_2O_3$). Alternatively, 10-YSZ ($ZrO_2$ doped with 10 mol % $Y_2O_3$) can also be used as the substrate material. The layer thickness is about 750 nm. The coating is carried out by means of EB PVD (electron beam physical vapor deposition) technology.

Table 1 below lists the process parameters set for the production of the $Y_2O_3$ layer by means of EB PVD.

TABLE 1

| | |
|---|---|
| Target material | $Y_2O_3$ |
| Substrate material (ceramic body) produced according to FIG. 5 | 8-YSZ or 10-YSZ |
| Sputtering temperature | 750° C. |
| Layer thicknesses of the functional coating | 0.75 μm, 1.5 μm |
| Heat treatment for defined adjustment of the graduated transition between the bulk ceramic and the EB PVD coating | 1, 3, 6, and 12 hours approximately 1,450° C. in air |

The transparent ceramic composite thus obtained is heated for at least 1 hour. Heating should, however, take place for no longer than 24 hours in order to avoid a complete concentration compensation with respect to the $Y_2O_3$ content between the bulk ceramic and the coating, as well as a coarse grain growth of the bulk ceramic and the coating. Both effects are associated with an undesirable reduction in fracture toughness. Heating takes place to temperatures above 1,200° C., and, particularly advantageously, to 1,450° C. Subsequently, the composite is rapidly cooled. Rapid cooling can, advantageously, take place by removal from a furnace and cooling at room temperature. Rapid cooling can, however, also take place by immersion in a liquid (so-called quenching).

In the case of a YSZ ceramic coated with $Y_2O_3$, such thermal treatment, for example, results in the $Y^{3+}$ ions diffusing from the functional coating into the YSZ of the ceramic and $Zr^{4+}$ ions diffusing from the ceramic into the yttrium coating, and a region with a continuous increase in the $Y_2O_3$ content in the YSZ ceramic thus forming toward the surface of the composite. The proportion of $ZrO_2$ decreases in the coating from the interface to the surface, such that pure $Y_2O_3$ is still, advantageously, retained on the surface itself. For this purpose, the duration of the heat treatment must be selected to be correspondingly short.

A YSZ ceramic with a higher $Y_2O_3$ proportion has a lower thermal expansion coefficient than a YSZ ceramic with a lower $Y_2O_3$ proportion. Thus, a compressive stress is produced in the graduated YSZ region at the surface after a corresponding temperature treatment. This is generally compensated for by a tensile stress in the interior of the component.

In FIG. 6 from [7], the thermal expansion coefficients α of zirconia stabilized with yttria (YSZ) are shown with various molar proportions of $Y_2O_3$ (of 3 mol % to 10 mol %). The greater the proportion of $Y_2O_3$ in the YSZ, the lower is the thermal expansion coefficient. Pure $Y_2O_3$ has an even lower expansion coefficient (values below $8 \cdot 10^{-6}$ $K^{-1}$).

FIG. 7 shows a scanning electron microscopic image of a thin, planar $Y_2O_3$ coating applied by means of EV PVD to a transparent ceramic body comprising zirconia stabilized with 8 mol % yttria (8-YSZ). The fracture surface of the layer system is shown.

Before coating, the transparent ceramic body comprising zirconia stabilized with 8 mol % yttria (8-YSZ) had a (light) transmittance of preferably more than 20% in the visible range, and preferably more than 50% in the infrared range. These properties were also maintained after the coating with $Y_2O_3$ and after the thermal treatment. The stress intensity factor $K_{IC}$ was estimated from the crack length c starting from the corners of the hardness impression and corresponds to a surface tension of 90 MPa. The fracture toughness of the coated and heat-treated component according to the invention is significantly greater (about 30%) than that of a comparably uncoated component (see FIG. 8).

TABLE 2

Exemplary estimated stress values within the ceramic

| | Base material YSZ | | | |
|---|---|---|---|---|
| | 10-8-10 | 8-6-8 | $Y_2O_3$-8-$Y_2O_3$ | $Y_2O_3$-8-$Y_2O_3$ |
| Substrate thickness [mm] | 2.4 | 2.4 | 2.4 | 2.4 |
| Layer thickness [µm] | 100 | 100 | 10 | 1 |
| Tensile stresses in the substrate [MPa] | 3.2 | 4.8 | 0.34 | 0.35 |
| Compressive stresses in the region near the surface [MPa] | −78 | −115 | −844 | −847 |

Two-sided coatings were in each case present in the aforementioned ceramics. In this case, "10-8-10" means the layer sequence 10YSZ-8YSZ-10YSZ, and "8-6-8" means the layer sequence 8YSZ-6YSZ-8YSZ. In the last two columns, $Y_2O_3$ was applied to an 8YSZ ceramic on both sides. The aforementioned, theoretically estimated stress values were determined with the aid of thermal expansion coefficients [7] known in the literature according to the following formula of G. De Porte et al. [8]:

$$\sigma_{res1} = -\frac{\varepsilon_M E_1'}{1+(t_1 E_1'/t_2 E_2')} \text{ and } \sigma_{res2} = -\sigma_{res1}\frac{t_1}{t_2}$$

Second exemplary embodiment for the production of a polycrystalline transparent ceramic according to the second embodiment of the invention In a further embodiment of the invention, the polycrystalline ceramic comprises $MgAl_2O_4$, and the layer applied thereto comprises MgO.

A polycrystalline ceramic, which was produced via route 1a or 1b and polished, and comprises $MgAl_2O_4$, is coated for this purpose with a thin layer comprising MgO. The layer thickness of the functional coating is 1 µm. The coating itself takes place by means of EB PVD (electron beam physical vapor deposition) technology.

The composites thus obtained were heated for 1, 3, 6, and 12 hours in argon to temperatures of at most 1,550° C. and subsequently removed from the furnace and cooled to room temperature.

In the case of the $MgAl_2O_4$ ceramic coated with MgO, the thermal treatment results in $Mg^{2+}$ ions diffusing from the functional coating into the $MgAl_2O_4$ of the ceramic and $Al^{3+}$ ions diffusing from the ceramic into the MgO coating, and a graduated $MgAl_2O_4$ region thus forming toward the surface of the polycrystalline transparent ceramic, which region is enriched with MgO toward the surface.

The MgO-rich spinel which forms at the surface has a greater crystal lattice constant than the $Al_2O_3$ spinel in the interior of the component, as a result of which a residual stress is generated at the surface after a corresponding temperature treatment, and the fracture toughness is thus increased.

Before the coating, the transparent ceramic body comprising $MgAl_2O_4$ had a (light) transmittance of preferably more than 50% in the visible range, and preferably more than 80% in the infrared range. These properties were also maintained after the coating with MgO and after the thermal treatment. The fracture toughness, which is in turn determined via the Vickers hardness test, of the coated and heat-treated component according to the invention is significantly greater than that of a comparable uncoated component.

Third exemplary embodiment for the production of a polycrystalline transparent ceramic according to the second embodiment of the invention In this case, ceramic powdery materials are used, which have different compositions with respectively different thermal expansion coefficients. The region near the surface with the graduated stoichiometric composition is formed by a composition which has a lower thermal expansion coefficient than the rest of the ceramic.

The press powder comprises 8-YSZ powder as the lower layer, for example. Higher-stabilized YSZ—in particular, 12-YSZ—is preferably used for the region near the surface. Further advantageous embodiments are, for example, the combination of YSZ powder with pure $Y_2O_3$ powder for the region near the surface, or also the combination of $MgAl_2O_4$ powder with MgO powder for the region near the surface.

The corresponding dry powders are sequentially placed in a press mold such that a planar interface is formed between the different materials. The same applies to the production via film casting with subsequent debinding. In this case, a layering is again possible in such a way that, at the bottom and on top, a corresponding region near the surface is respectively formed (sandwich structure).

Depending upon the method route, the powders are first pre-compacted uniaxially or/and via cold pressing and, subsequently, preferably sintered or recompacted at pressures of around 300 MPa and/or at temperatures of around 1,450° C.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

CITED REFERENCES

[1] Fraunhofer Institute for Ceramic Technologies and Systems (IKTS): Transparent spinel ceramic ($MgO.Al_2O_3$), http://www.ikts.fraunhofer.de/de/forschungsfelder/werkstoffe/oxidkeramik/transparent keramik/transpspinellkeramik.html.
[2] Polycarbonate: D. C. Miller, M. D. Kempe, C. E. Kennedy, S. R. Kurtz, "Analysis of Transmitted Optical Spectrum Enabling Accelerated Testing of Multijunction Concentrating Photovoltaic Designs," Opt. Eng. 50 [1] 201 1.
[3] Borosilicate: Optical Spectrum of Borofloat Borosilicate Glass, Valley Design Corporation, www.valleydesign.com.
[4] $c-ZrO_2$: I. Yamashita, M. Kudo, K. Tsukuma, "Development of Highly Transparent Zirconia Ceramics," TOSOH Research & Technology Review, Vol. 56 (2012).
[5] $MgAl_2O_4$: M. Rubat du Merac, PhD Thesis, Colorado School of Mines, 2014.
[6] G. R. Anstis, P. Chantiklul, B. R. Lawn, and D. B. Marshall, A critical evaluation of indentation techniques for measuring fracture toughness: I, Direct crack measurements. J. Am. Ceram. Soc. 64 (1981) 533-538.
[7] H. Hayashi, T. Saitou, N. Maruyama, H. Inaba, K. Kawamura, M. Mori, "Thermal Expansion Coefficient of Yttria-Stabilized Zirconia for various Yttria Contents," Solid State Ionics 176, 613-619 (2005).
[8] G. de Portu, L. Micele, G. Pezzotti, "Laminated Ceramic Structures from Oxide Systems," Composites: Part B 37 556-57 (2006).

The invention claimed is:

1. A transparent polycrystalline ceramic, comprising:
a polycrystalline transparent ceramic body formed of a substrate material, the substrate material being a YSZ ceramic, wherein the YSZ ceramic is $ZrO_2$ doped with $Y_2O_3$, wherein the YSZ ceramic is 8-YSZ; and
a transparent ceramic surface region having a coating formed of $Y_2O_3$,
wherein a thermal expansion coefficient ratio of a thermal expansion coefficient of the polycrystalline transparent ceramic body to a thermal expansion coefficient of the transparent ceramic surface region is greater than 1,
wherein the thermal expansion coefficient ratio provides a compressive stress in the transparent ceramic surface region and further provides a tensile stress in the polycrystalline ceramic body, and
wherein a ratio of the compressive stress to the tensile stress exceeds 25.

2. The transparent polycrystalline ceramic according to claim 1, wherein the transparent ceramic surface region is disposed on a top side of the polycrystalline ceramic body, the transparent polycrystalline ceramic further comprising:
a second transparent ceramic surface region having a coating formed of $Y_2O_3$,
wherein a second thermal expansion coefficient ratio of the thermal expansion coefficient of the polycrystalline transparent ceramic body to a thermal expansion coefficient of the second transparent ceramic surface region is greater than 1, and
wherein the second thermal expansion coefficient ratio provides a second compressive stress in the second transparent ceramic surface region.

3. The transparent polycrystalline ceramic body according to claim 1, wherein the ratio of the compressive stress to the tensile stress exceeds 2000.

4. The transparent polycrystalline ceramic according to claim 1, wherein the transparent ceramic surface region includes a yttrium concentration gradient that varies from a concentration of yttrium in $Y_2O_3$ to a yttrium concentration in the YSZ ceramic.

5. The transparent polycrystalline ceramic according to claim 1, wherein the polycrystalline transparent ceramic body includes a core region, the core region having a homogeneous yttrium concentration.

6. The transparent polycrystalline ceramic according to claim 1, wherein the coating has a thickness of between 0.1 µm and 10 µm.

7. The transparent polycrystalline ceramic according to claim 6, wherein the coating is formed of pure $Y_2O_3$.

8. The transparent polycrystalline ceramic according to claim 4, wherein the coating has a thickness of between 0.1 µm and 10 µm.

9. The transparent polycrystalline ceramic according to claim 8, wherein the coating is formed of pure $Y_2O_3$.

10. A transparent polycrystalline ceramic, comprising:
a polycrystalline transparent ceramic body formed of a substrate material, the substrate material being a YSZ ceramic, the YSZ ceramic being $ZrO_2$ doped with $Y_2O_3$; and
a transparent ceramic surface region having a coating formed of pure $Y_2O_3$,
wherein a thermal expansion coefficient ratio of a thermal expansion coefficient of the polycrystalline transparent ceramic body to a thermal expansion coefficient of the transparent ceramic surface region is greater than 1, and
wherein the thermal expansion coefficient ratio provides a compressive stress in the transparent ceramic surface region.

11. The transparent polycrystalline ceramic of claim 10, wherein the coating has a thickness of between 0.1 µm and 10 µm.

12. The transparent polycrystalline ceramic of claim 10, wherein the polycrystalline transparent ceramic body includes a core region, the core region having a homogeneous yttrium concentration.

13. The transparent polycrystalline ceramic of claim 10, wherein the transparent ceramic surface region includes a yttrium concentration gradient that varies from a concentration of yttrium in the pure $Y_2O_3$ coating to a yttrium concentration in the YSZ ceramic.

14. A transparent polycrystalline ceramic, comprising:
a polycrystalline transparent ceramic body formed of a substrate material, the substrate material being a YSZ ceramic, the YSZ ceramic being $ZrO_2$ doped with $Y_2O_3$; and
a transparent ceramic surface region having a coating formed of $Y_2O_3$,
wherein a thermal expansion coefficient ratio of a thermal expansion coefficient of the polycrystalline transparent ceramic body to a thermal expansion coefficient of the transparent ceramic surface region is greater than 1, and
wherein the thermal expansion coefficient ratio provides a compressive stress in the transparent ceramic surface region, and
wherein the compressive stress is in a range of 150 to 750 MPa.

15. The transparent polycrystalline ceramic of claim 14, wherein the coating has a thickness of between 0.1 μm and 10 μm.

16. The transparent polycrystalline ceramic of claim 14, wherein the polycrystalline transparent ceramic body includes a core region, the core region having a homogeneous yttrium concentration.

17. The transparent polycrystalline ceramic of claim 14, wherein the transparent ceramic surface region includes a yttrium concentration gradient that varies from a concentration of yttrium in the $Y_2O_3$ coating to a yttrium concentration in the YSZ ceramic.

* * * * *